United States Patent [19]

Barber et al.

[11] 4,248,189
[45] Feb. 3, 1981

[54] SPARK PLUG AND ADAPTER FOR LEAN MIXTURE ENGINE CYLINDERS

[75] Inventors: Alvan W. Barber, Daytona Beach, Fla.; Leslie M. L. James, Santa Barbara, Calif.

[73] Assignee: Universal Straticication Systems, Inc., Daytona Beach, Fla.

[21] Appl. No.: 22,297

[22] Filed: Mar. 20, 1979

[51] Int. Cl.³ .............................................. F02B 19/10
[52] U.S. Cl. ................................ 123/169 PA; 123/273
[58] Field of Search ............... 123/169 PA, 132 SP, 123/132 ST, 191 SP, 193 B, 169 P

[56] References Cited
U.S. PATENT DOCUMENTS

| 2,153,598 | 4/1939 | Steward | 123/191 JP |
|---|---|---|---|
| 2,397,367 | 3/1946 | Orzel | 123/169 PA |
| 2,642,154 | 6/1953 | Wright | 123/191 JP |
| 3,661,125 | 5/1972 | Stumpfig | 123/143 B |
| 3,710,764 | 1/1973 | Joahin | 123/32 SP |
| 4,006,725 | 2/1977 | Baczek et al. | 123/32 SP |
| 4,041,922 | 8/1977 | Abe et al. | 123/32 SP |
| 4,091,771 | 5/1978 | Rapp et al. | 123/32 SP |

Primary Examiner—Charles J. Myhre
Assistant Examiner—R. A. Nelli
Attorney, Agent, or Firm—Mason, Fenwick & Lawrence

[57] ABSTRACT

A novel spark plug adapter unit for spark plugs of an internal combustion engine having a main combustion chamber defined by a cylinder bore and its associated piston and a valved intake passage for introducing a lean fuel-air mixture in the combustion chamber. The spark plug adapter mounted in the engine in the threaded socket for the conventional spark plug has a mini-combustion or spark ignition chamber about the spark gap and a valved branch passage to the ignition chamber connected to a first fuel supply, such as a raw fuel source or a rich fuel-air mixture source, to achieve ignition thereof in the ignition chamber causing a flame discharge which ensures ignition of another fuel mixture, such as a lean mixture, in the main combustion chamber.

23 Claims, 10 Drawing Figures

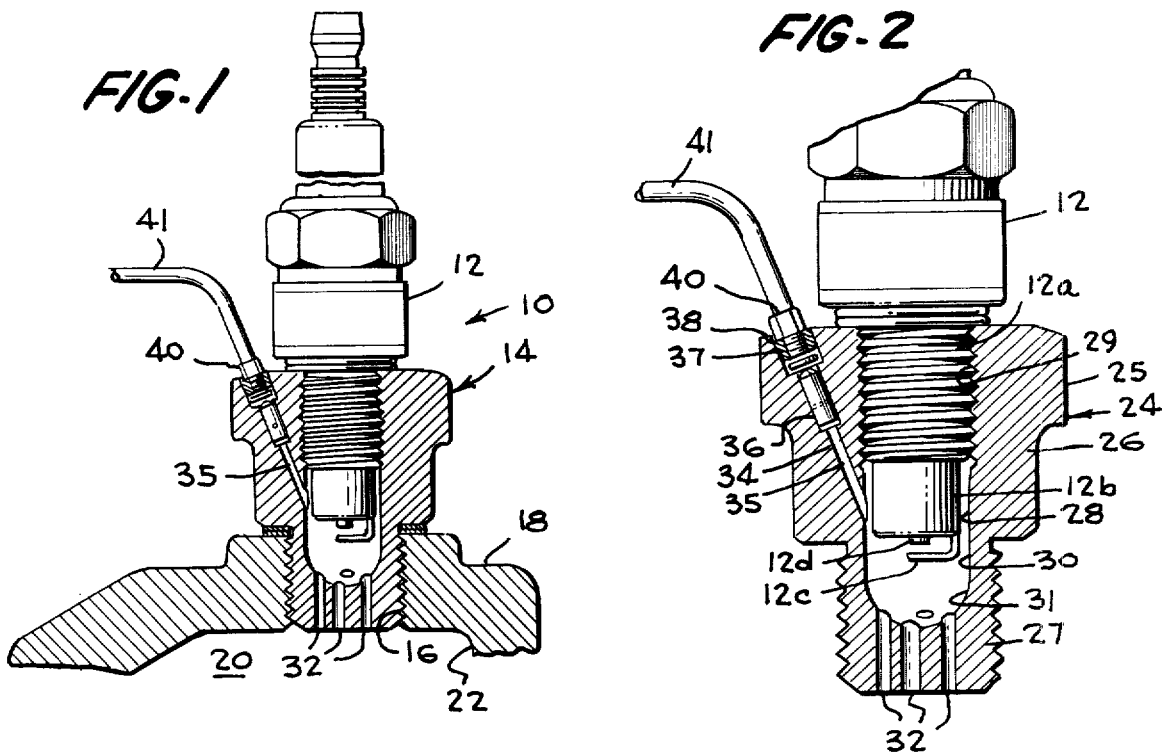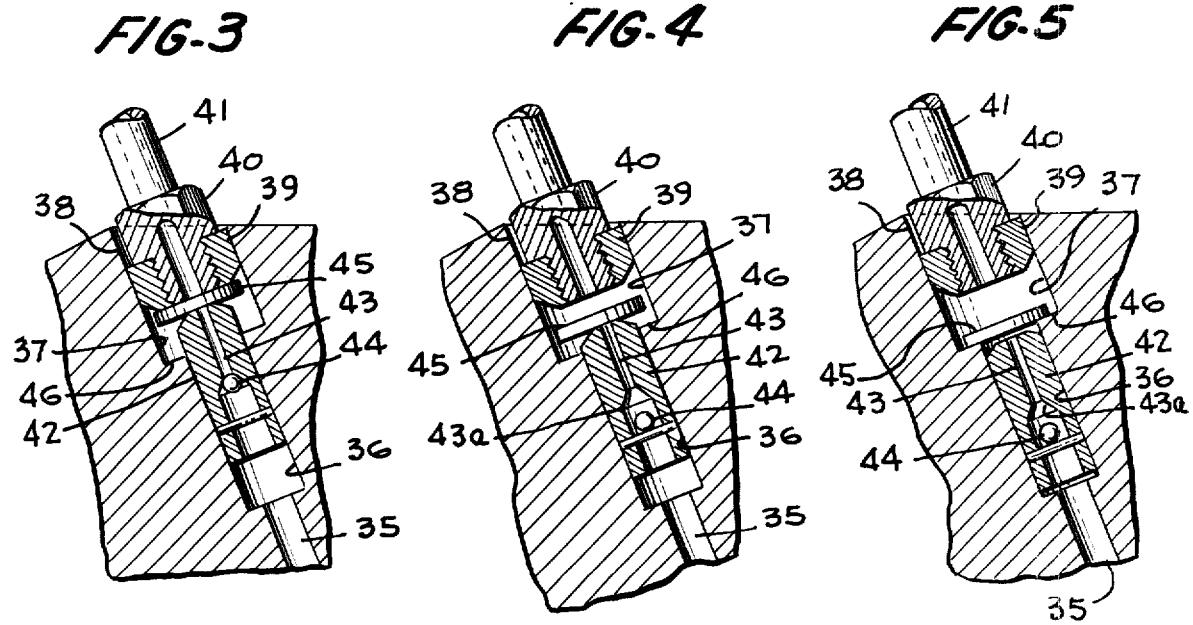

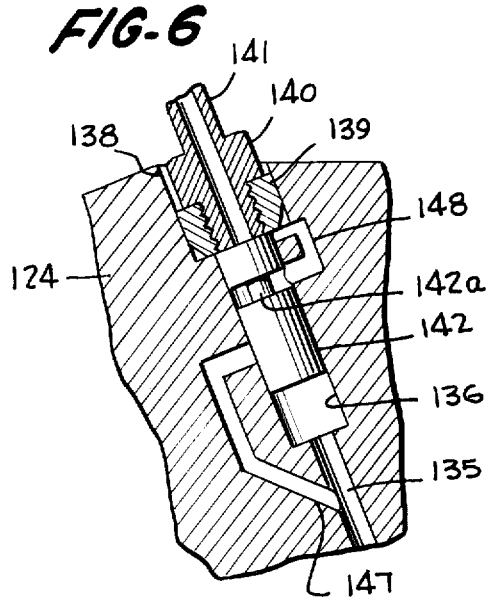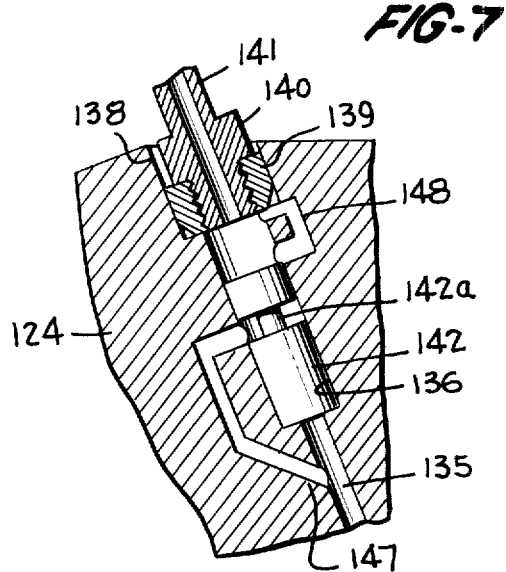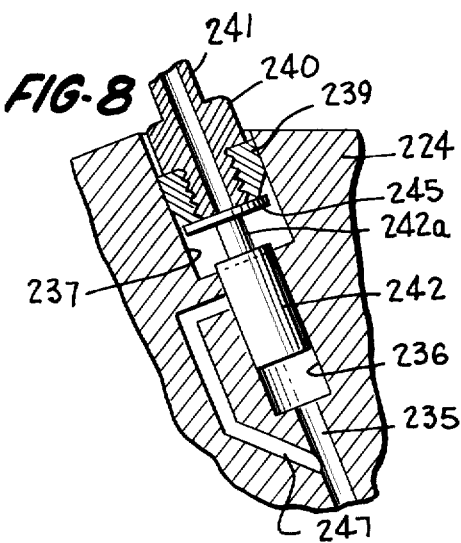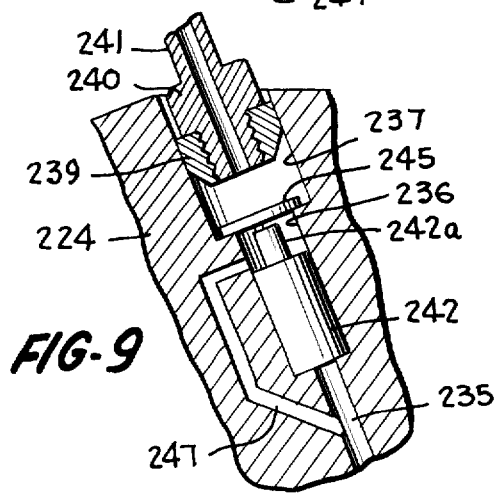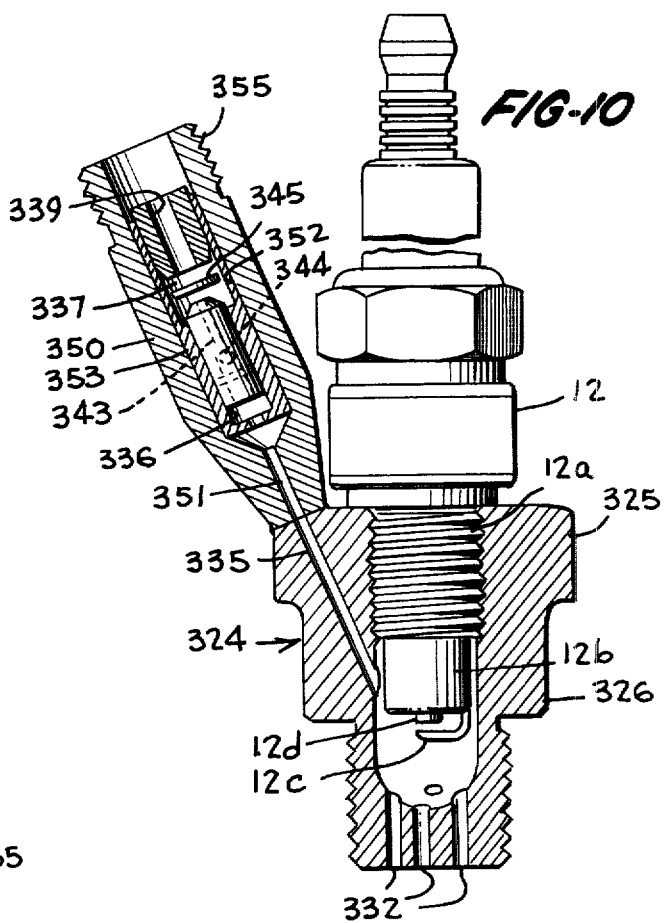

SPARK PLUG AND ADAPTER FOR LEAN MIXTURE ENGINE CYLINDERS

BACKGROUND AND OBJECTS OF THE INVENTION

The present invention relates in general to spark plug assemblies for internal combustion engines, and more particularly to the construction of spark plug housing adapters for each cylinder of multi-cylinder internal combustion engines providing an ignition or mini-combustion chamber formed by a portion of the adapter immediately surrounding the electrodes of the spark plug for ignition of raw fuel or a rich combustible mixture producing flame for readily igniting a lean combustible mixture.

Heretofore, it has been known that a relatively lean combustible mixture designed to maximize gasoline mileage in internal combustion engines is frequently difficult to ignite and often does not burn completely. This results in frequent misfiring or failure to fire the lean combustion mixture in the main combustion chambers of the internal combustion engines using them and also increases the air pollution caused by the exhaust from the internal combustion engine, both due to failure of ignition when this occurs and also due to failure of the mixture to burn completely even though ignition may occur.

Some efforts to reduce air pollution resulting from noxious gases in the exhaust of internal combustion engines have involved addition of air injection pumps to the internal combustion engine, exhaust recycling systems to cut down the formation of smog producing chemicals, and use of catalytic converters fitted into the exhaust system of the automobile to convert harmful constituents of the engine exhaust into harmless chemical components or compositions. All of these measures involve adding on of additional or auxiliary devices to automobiles, and in most cases have reduced the gasoline mileage attainable, thus increasing the consumption of fuel energy and further compounding the already difficult energy consumption problem.

Efforts have been made to achieve greater fuel economies in internal combustion engines and concurrently obtain greater reliability of ignition and more complete combustion by redesigning the engine block to define a smaller auxiliary combustion chamber or ignition chamber communicating with each respective main combustion chamber with a spark plug associated with each auxiliary combustion chamber having its electrode gap in the auxiliary combustion chamber and with a valved fuel supply line to the auxiliary combustion chamber providing a rich fuel-air mixture to the auxiliary combustion chamber for reliable ignition and a second fuel mixture supply conduit supplying a lean fuel-air mixture to the main combustion chamber. Examples of such arrangements are found in the earlier U.S. Pat. Nos. 3,844,259 and 3,853,097 granted to Honda Motor Co., Ltd. In such prior art systems the rich air-fuel mixture is supplied through an intake valve to the auxiliary combustion chamber specially formed in the engine block during the downstroke or suction stroke of the piston for the associated cylinder, and the rich mixture which is readily ignited by the associated spark plug produces a flame discharge communicating with the lean mixture supplied to the main combustion chamber during the same suction stroke of the piston to achieve more reliable ignition and more complete combustion of the lean mixture. However, the designs employed in those prior patented systems require specially formed engine blocks designed so that the configuration of the engine block provides for the auxiliary combustion chamber or ignition chamber in which ignition of the rich fuel-air mixture occurs to produce the flame which achieves ignition of the lean fuel-air mixture in the main combustion chamber. That system of ignition is not adaptable for use in already existing conventional internal combustion engine blocks, because new engine blocks would be required to provide the special auxiliary combustion chamber configuration and valved rich mixture intake supply system needed in those prior art designs. More recently, spark plug assemblies of the construction shown in U.S. Pat. Nos. 4,006,725 and 3,926,169 have been proposed having a valved passage for a readily ignitable charge of fuel and air to achieve ignition of the lean fuel-air mixture in the main combustion chamber, but better metering of the fuel charge admitted through the valved passage is desired.

An object of the present invention is the provision of a novel replacement spark plug assembly for internal combustion engines wherein the replacement spark plug assembly incorporates an apertured dome structure forming a mini-combustion chamber surrounding the electrode gap to define an auxiliary ignition chamber and includes within the assembly a valved intake conduit for communication with a raw fuel source to admit an accurately metered charge of the raw fuel to the auxiliary ignition chamber to achieve ignition and production of flame for igniting a lean fuel mixture in the main combustion chamber of the associated engine cylinder.

Another object of the present invention is the provision of a novel spark plug adapter unit which may be fitted into conventional automobile engine heads in place of the standard spark plug and provide for ignition of a metered quantity of raw fuel in a limited size ignition chamber defined at the electrode gap of a spark plug to produce flame for ensuring ignition and more complete burning of a lean fuel-air mixture in the combustion chamber of the associated engine cylinder.

Another object of the present invention is the provision of a novel spark plug assembly as defined in either of the two preceding paragraphs, wherein ports in the walls of the mini-chamber communicating with the main combustion chamber provide air flow from the latter into the mini-chamber during the compression stroke of the associated piston to produce a turbo-action within the mini-chamber for maximum atomization of raw fuel admitted through the valved intake conduit, and a mini-piston and movable disc coact to properly meter the raw fuel charge.

Other objects, advantages and capabilities of the present invention will become apparent from the following detailed description, taken in conjunction with the accompanying drawings showing a preferred embodiment of the invention.

BRIEF DESCRIPTION OF THE FIGURES

FIG. 1 is a diagrammatic section view of the upper cylinder head portion of an engine having a spark plug and adapter assembly constructed in accordance with the present invention;

FIG. 2 is a vertical section, to enlarged scale, of the spark plug and adapter of the present invention;

FIG. 3 is an enlarged fragmentary section view of the metering chamber portion of the adapter, showing the positions of the piston and floating disc during the compression, power and exhaust strokes of the associated engine combustion chamber;

FIG. 4 is an enlarged fragmentary section view similar to FIG. 3, but showing the piston and floating disc positions during the transition period at the beginning of the intake stroke of the associated engine combustion chamber;

FIG. 5 is an enlarged fragmentary section view similar to FIGS. 3 and 4, showing the positions of the piston and floating disc at the end of the transition period or intake stroke;

FIG. 6 is a fragmentary vertical section view through the spark plug and adapter of a modified construction at a position similar to FIG. 3, showing the piston and floating disc during the compression, power and exhaust events;

FIG. 7 is an enlarged fragmentary section view of the modification of FIG. 6, showing the piston and floating disc in the positions occupied during the intake event;

FIG. 8 is a fragmentary vertical section view through the spark plug and adapter of another modified construction at a position similar to FIG. 3, showing the piston and floating disc during the compression, power and exhaust events;

FIG. 9 is an enlarged fragmentary section view of the modification of FIG. 8, showing the piston and floating disc in the positions occupied during the intake event; and, FIG. 10 is a diagrammatic section view similar to FIG. 2, but of another embodiment having the branch passage and piston and disc located more remotely from the spark gap of the spark plug.

DETAILED DESCRIPTION OF PREFERRED EMBODIMENTS

Referring to the drawings, wherein like reference characters designate corresponding parts throughout the several figures, and particularly to FIGS. 1 through 5, the spark plug adapter assembly of the present invention, indicated generally by the reference character 10, includes a spark plug 12 and a spark plug housing adapter 14 adapted to be assembled with the spark plug 12 in the conventional internally threaded opening or port 16 provided in the cylinder head or wall 18 of the engine block of an internal combustion engine designed to normally receive and mount the spark plug. The internally threaded port 16 for the conventional or standard spark plug, as is well known, opens into the main combustion chamber 20 defined by that portion of the cylinder 22 served by the spark plug occurring above the piston moving in the cylinder 22.

The adapter 14 of the embodiment shown in FIGS. 1-5 is generally in the shape of a cylindrical sleeve or collar member having portions of different diameters, including an upper larger diameter body 24, having, for example, a hexagonal upper head portion 25 resembling a threaded nut and adapted to be interfitted with a wrench or similar tool for threading the adapter into the cylinder head, and including a generally cylindrical slightly smaller diameter head portion 26 forming the intermediate portion of the body 24, from the lower end of which extends an externally threaded smaller diameter neck portion 27 of the body 24. The body portion includes a main center bore 28 opening through the top of the adapter body 24 having an internally threaded upper bore portion 29 of appropriate diameter and thread pitch to receive and support the threaded portion 12a of the spark plug 12 therein. The center bore 28 also includes an intermediate generally cylindrical portion 30 extending downwardly from the threaded upper bore portion 29 defining a chamber to receive the lower insulator portion 12b of the spark plug 12, provided for example by modifying a standard 10 mm spark plug by removing a short length of the threaded sleeve 12a. The center bore 28 is shaped at its lower end to define a dome-like mini-combustion chamber 31 located immediately below the electrodes 12c and 12d of the spark plug 12. The dome-like mini-combustion chamber portion 31 is located in the constricted diameter externally threaded neck portion 27 of the body 24, and smaller diameter communication ports or passages 32 extend from the generally hemispherical lower end wall of the dome-like mini-combustion chamber 31 to the bottom end of the neck portion 27 to communicate gaseous flow between the main combustion chamber 20 and the mini-combustion chamber 31.

A branch bore 34 inclined at an angle to the axis of the main center bore 28 to form a downwardly converging acute angle therewith extends from the cylindrical midportion 30 of the bore 28 upwardly through the head portions 25 and 26 of the body 24 to an exit opening 38 in the top of the upper head portion 25 laterally spaced from the threaded upper bore portion 29 opening therethrough. The branch bore 34 includes a lower smaller diameter passage portion 35 opening at its lower end into the main center bore 28, and intermediate diameter chamber or cylinder portion 36 forming a piston receiving and metering chamber as hereinafter described, and a larger diameter upper chamber 37 extending to the exit opening 38 in the top of the head portion of the body. An annular throat member 39 is fixed in the uppermost end portion of the larger diameter chamber 37 of branch passage 34 and is provided with an internally threaded center opening to receive the threaded end portion of a fuel intake fitting 40 on the end of the supply conduit 41 leading to the fuel supply manifold or source.

Slideably movable within the intermediate diameter chamber 36 is a piston 42 which is of cylindrical exterior configuration over most of its length and tapered to form a frusto-conical upper end portion, and having a central passage 43 therethrough which is of smaller diameter over its upper portion and larger diameter along its lower portion providing a valve seat 43a in the intermediate part of the piston coacting with a ball valve member 44 captured in the larger diameter portion of the passage 43 adjacent the valve seat 43a to form a mini-ball check valve therein. A floating disc 45 is provided in the portion of the chamber 37 between the annular throat member 39 and fitting 40 at the upper end and the transistion wall 46 at the lower end of the larger diameter chamber 37, forming a transition chamber for the branch passage.

The disc 45 acts as a one-way valve to check the gas pressure during the compression, power and exhaust events, in the condition illustrated in FIG. 3, by seating against the throat member 39 and fuel intake fitting 40. This achieves a gas tight seal, preventing a backpressure buildup in the fuel line 41 and the fuel manifold. During the transition period illustrated in FIG. 4, which is the beginning of the intake stroke, the disc 45 acts as a check valve disallowing unmetered fuel to be drawn through the piston 42 and past the mini-ball check valve formed by the ball member 44 and valve seat 43a and into the mini-combustion chamber 31. At the end of the transition period when the parts are in the condition illustrated in FIG. 5, the disc 45 checks the fuel flow and disallows additional fuel to enter the metering chamber formed by the space within the intermediate diameter chamber 36 below the disc 45 which is closed against the transition wall 46 and the truncated conical or tapered upper end portion of the piston 42, and the portions of the piston passage 43 between its upper end and the location of the ball valve member 44.

The piston 42 is so constructed that when it is at the bottom of its stroke and seated, it forms the metering chamber, using the floating disc 45, the wall of the cylinder or intermediate diameter chamber 36, and the tapered head of the piston 42. The piston 42 also acts as an actuator for moving the floating disc 45 to check gas pressure.

The mini-ball check valve formed by the ball member 44 and valve seat 43a is incorporated as a part of the piston 42 and is actuated by differentials of gas pressure only. Its purpose is to form two paramount different functions: first, during the compression, power and exhaust events in the condition illustrated in FIG. 3, the ball member 44 is seated against the seat 43a, disallowing gas pressure to pass this point; second, by checking the gas pressure at this point, the piston 42 is forced to the top of its stroke and moves the floating disc 45 to the top of its travel, thereby shutting off the flow of fuel into the transition chamber formed in the lower portion of the larger diameter chamber 37 and providing an additional checkvalve for gas pressure.

During the intake event when the parts are in the condition illustrated in FIG. 5, the ball valve in the piston 42 is open, thus allowing fuel to be drawn from the metering chamber in the upper portion of the chamber 36 through the passage 43 in the piston 42 and past the mini-ball check valve and into the mini-combustion chamber 31.

The metering chamber in the upper portion of the intermediate diameter cylinder or chamber 36 is in effect when the piston 42 is at the bottom of its stroke, during the intake event of FIG. 5, and the floating disc 45 is seated, at the bottom of its travel. The tapered area at the top of the piston 42 holds a predetermined volume of fuel, which is drawn through the passage 43 of the piston 42 to be used in the primary ignition of the combustion mixture in the main combustion chamber 20.

The transition chamber is formed when the floating disc 45 is off both of its seats and the piston 42 is at approximately the midpoint of its travel, During this time, fuel under pressure is allowed to fill the metering chamber so as to be available for the succeeding intake event.

This valve unit operates independent of any mechanical or electrical apparatus, and will operate in any position and using a positive fuel pressure taken directly from the fuel supplied to the carburetor. It functions effectively to check the fuel flow in one direction, to check gas pressure in one direction arising during compression, power and exhaust events, and to meter a specific quantity of fuel into the mini-combustion chamber to produce the proper fuel-air raito for ignition. It thus provides a fuel control valve structure in the plug adapter controlling fuel supply through the branch passage into the mini-combustion chamber, to provide for effective ignition of lean fuel-air mixtures in the main combustion chamber, in a device which is simple in construction and provides a very long service free life with little or no maintenance. Its operation is very precise and delicate, and depends solely on the four major events of the internal combustion engine, namely compression, power, exhaust and intake.

This adapter unit is specially designed to screw into the existing spark plug threads of the cylinder head, thus making its application universal, easy to install, and easy to service. The adapter unit is designed to either accept standard plugs or a modified 10 mm spark plug, and provides a mini-combustion chamber incorporated within the unit which provides a suitable location for the mixing of the fuel/air charge to bring about the correct stoichiometric mixture for primary ignition within the mini-chamber. The adapter ports are specifically sized and angled to provide maximum fuel/air flow into the mini-chamber during the intake event and compression event. They also provide maximum flame travel out of the mini-chamber 31 during the ignition event. These flame jets produce the secondary ignition of the lean fuel/air charge within the main combustion chamber 20, and the ports are so positioned and angled, in the preferred embodiment, so as to produce a turbo-action within the mini-combustion chamber 31, bringing about maximum atomization of the fuel being introduced through the branch passage into the mini-combustion chamber. This turbo-action also creates a cooling effect at the plug electrodes, thereby eliminating plug breakdown due to overheating and producing a cleansing action which disallows the buildup of oil or carbon on the plug electrodes.

Referring now to FIG. 6 and 7, there is illustrated a modified form of the present invention wherein much of the structure is identical to that of the previously described embodiment, but wherein the piston does not have a central passage or mini-ball check valve therein. Instead a bypass passage is associated with the intermediate diameter chamber of the branch passage or bore. In the form illustrated in FIGS. 6 and 7, the parts which correspond to the parts of the previously described embodiment are indicated by one hundred series reference characters otherwise corresponding to those used in the previous embodiment. The difference between construction of the embodiment of FIGS. 6 and 7 and that of the embodiment of FIGS. 1–5 lies solely in the construction of the piston, here indicated by the reference character 142, and branch passages or bypass passages associated with the intermediate diameter chamber 136 and the smaller diameter passage section 135. In the embodiment of FIGS. 6 and 7, the piston is provided with a circumferential groove 142a forming a specifically sized channel to provide a metering chamber, which registers with the inlet end of a first bypass passage 147 when the piston is at the bottom of its travel. The bypass passage 147 extends from the position of the metering chamber groove 142a when the piston 142 is at its lower stroke limit or bottom position, illustrated in FIG. 7, to connect with the smaller diameter passage section 135 below its juncture with the intermediate diameter chamber 136. Another bypass passage 148 extends from the uppermost end of the intermediate chamber section 136 in bypass relation to an outlet opening which registers with the metering chamber forming groove 142a when the piston 142 is at its upper stroke limit or the top of its travel in the compression, power and exhaust event positions of FIG. 6.

In this embodiment, unmetered fuel is supplied through the fuel supply line 141 and inlet fitting 140 from the same pressurized source which supplies the carburetor. This unmetered fuel is made available to the metering chamber formed by the groove 142a in the piston when the piston 142 is at the top of its travel during the compression, power and exhaust events as depicted in FIG. 6. During the intake event depicted at FIG. 7, the piston 142 is at the bottom of its travel, which aligns the metering chamber 142a in the piston 142 with the metered fuel passage 147. Fuel is drawn from the metering chamber defined by the groove 142a through this metered fuel passage 147 and into the mini-combustion chamber 31 where it is atomized for primary ignition. The metering chamber formed by the slot 142a is a specifically sized slot in the piston such that, when the piston is at the top of its travel, the metering chamber is aligned with the unmetered fuel supply through the passage 148, thus allowing filling of the metering chamber. When the piston 142 is at the bottom of its travel, the metering chamber 142a is aligned with the metered fuel passage 147 and the minute charge of fuel is drawn out through the passage 136 into the mini-combustion chamber. The metering chamber is designed to meter the same proportion of fuel per stroke regardless of the engine R.P.M.. The piston 142 is actuated by differentials of gas pressure only, suction during the intake event of FIG. 7, and pressure during the compression, power and exhaust events of FIG. 6. The piston 142 acts as a valve with two different functions. During the compression, power and exhaust events of FIG. 6, the piston 142 at the top of its travel closes off the unmetered fuel supply through the inlet fitting 40 and supply conduit 141 and acts as a sliding valve, and closes the metered fuel passage 147, whereby no back pressure is allowed beyond this point so that there is no problem with pressure buildup in the fuel supply lines and manifold.

Yet another embodiment is shown in FIGS. 8 and 9, corresponding to FIGS. 6 and 7 but showing a slightly modified arrangement wherein the piston is indicated by the reference character 242 and is provided with the metering groove or slot forming the metering chamber, indicated at 242a, at the uppermost end of the piston, coactive with the floating disc 245 and with a metered fuel branch passage 147.

In the embodiment of FIGS. 8 and 9, unmetered fuel is supplied to the fuel control valve formed by the piston 242 from the same pressurized source which supplies the carburetor. This unmetered fuel is made available to the metering chamber formed by the space surrounding the reduced cross section upper end portion of the piston 242 forming the annular chamber 242a, during the transition period when the piston 242 is between the top and bottom of its travel. When the piston 242 is at the bottom of its travel, the floating disc 245 is seated and the metering chamber is formed and the fuel supply is shut-off.

During the intake event illustrated in FIG. 9, the disc 245 checks fuel flow and disallows addtional fuel to enter the metering chamber. During the compression, power and exhaust events depicted in FIG. 8, the disc 245 acts as a one-way valve to check the back pressure gasses by seating against the throat member 239 and fuel intake fitting 240. This achieves a gas tight seal, preventing a back pressure buildup in the fuel lines and fuel manifold. The metering chamber 242a is in effect when the piston 242 is at the bottom of its stroke, during the intake event of FIG. 9, and the floating disc 245 is seated at the bottom of its travel. The chamber which is formed between the disc 245 and the relieved or smaller cross section end of the piston 242 holds a specific quantity of fuel, which is drawn through the metered fuel passage 247 and into the mini-combustion chamber 31 to be used in primary ignition. The metered fuel passage 247 is open only when the piston is at the bottom of its travel, so that metered fuel is drawn through this passage and into the mini-combustion chamber 31 during the intake event, depicted in FIG. 9. This passage is closed by the upward movement of the piston 242 during the compression, power and exhaust events. The piston 242 is actuated by the differentials of gas pressure only: suction during the intake event; pressure during the compression, power and exhaust events. The piston 242 when at the bottom of its stroke forms the metering chamber, using the floating disc 245, the cylinder walls of the intermediate diameter chamber 236, and the relieved or smaller cross section end of the piston defining the circumferential groove or annular chamber 242a. The piston 242 also acts as an actuator for moving the floating disc 245 to check gas pressure.

FIG. 10 shows yet another variation or modification, wherein the parts corresponding to parts shown in FIGS. 1-5 are indicated by reference characters in the 300 series with the last two digits corresponding to the reference characters of corresponding parts in FIGS. 1-5. In the embodiment shown in FIG. 10, the smaller diameter passage portion 335 corresponding to the passage 35 in the first described embodiment extends through the whole height of the head portion 325 and 326 of the body 324 without any change in diameter and without providing any piston chamber or piston or floating disc therein, and instead, an extension 350 projects concentrically with the extended center axis of the passage 335 above the top of the body portion 324 and has a passage 351 of a diameter corresponding to the passage 335 extending upwardly in alignment and communication with the passage 335 for a selected distance to a larger diameter bore portion 352 in which a sleeve 353 is fixed defining a piston cylinder or intermediate chamber 336 corresponding to the intermediate diameter 136 and 236 of previously described embodiments slideably receiving a piston 342 corresponding to the piston 42 of the first described embodiment of FIGS. 1-5 having a passage 343 therethrough defining a valve seat and a ball valve member 344, and having a tapered or truncated conical upper end portion in a larger diameter chamber 337 having a floating disc 345 therein and an annular, centrally bored throat member 339 against which the floating disc member 345 seats in the compression, power and exhaust event conditions. The extension 350 also has an externally threaded upper end portion 355 to permit a threaded fitting on the end of the fuel supply conduit to be fixed to the extension 350.

The purpose of the extension 350 and the components incorporated therein is to sufficiently isolate the piston 342 and its mini-ball check valve 344 and floating disc 345 from high temperatures which may be present in the portion of the adapter body 324 forming the mini-combustion chamber 331 and the portions surrounding the electrodes 12d and 12c defining the spark gap of the spark plug 12 so that the temperatures in the area of the spark gap and the mini-combustion chamber will not sufficiently affect the incoming fuel through the branch conduit to vaporize the incoming fuel and pressurize the fuel line before reaching the metering section of the valve system. By the arrangement shown in FIG. 10, the valve unit is placed approximately one inch from the mini-combustion chamber 31 to provide sufficient insulation from the heat produced by combustion in the mini-combustion chamber to avoid malfunction of the valve and piston system. It will be apparent that a similar extension structure may be provided for the forms of FIGS. 6 and 8.

What is claimed is:

1. A spark plug and adapter assembly for an internal combustion engine having an ignition fuel source conduit and plural main combustion chambers supplied with a lean fuel/air mixture, the combustion chambers of the engine having intake, compression, power and exhaust phases, the assembly comprising a spark plug for each main combustion chamber having an elongated body supporting electrodes defining a spark gap at one end thereof and a threaded portion, a spark plug adapter having a bore threaded and sized to receive said threaded portion and the electrode end portion of the spark plug and having means surrounding a portion of said bore defining a dome-like mini-combustion chamber of limited volume surrounding and enclosing the spark gap and having communication ports for passage of gasses therethrough between the main combustion chamber and the mini-combustion chamber, branch passage means having a branch passage communicating at one end with said mini-combustion chamber and at its other end with said ignition fuel source conduit to supply fuel to the mini-combustion chamber during the intake phase for the associated main combustion chamber, fuel metering means interposed in said branch passage for metering the quantity of the ignition fuel admitted into the mini-combustion chamber during the intake phase including first and second serially connected chamber portions having a metering piston movable axially in the first chamber portion between projected and retracted positions reponsive to pressure conditions communicated from the main combustion chamber and a disc member movable in the second chamber portion by said piston to a first position closing an end of the first chamber portion to define with said piston in retracted position a fuel trapping metering chamber of predetermined volume therein communicating with the mini-combustion chamber during the intake phase and movable by the piston upon piston movement to projected position to occupy a second position during the combustion, power and exhaust phases closing off branch passage communication with said fuel source conduit.

2. A spark plug and adapter assembly as defined in claim 1, wherein said disc member is a free floating disc in said second chamber portion.

3. A spark plug and adapter assembly as defined in claim 1, wherein said adapter is in the form of a collar member for enshrouding the portions of the spark plug adjacent the spark gap having a larger diameter head portion defining a generally cylindrical body including an exterior hexagonal nut-like formation for coaction with wrench tools and the collar member including a smaller diameter externally threaded throat portion to interfit into a conventional spark plug socket in the engine, said bore extending throughout the length of said head portion and terminating in said mini-combustion chamber in said throat portion.

4. A spark plug and adapter assembly as defined in claim 2, wherein said adapter is in the form of a collar member for enshrouding the portions of the spark plug adjacent the spark gap having a larger diameter head portion defining a generally cylindrical body including an exterior hexagonal nut-like formation for coaction with wrench tools and the collar member including a smaller diameter externally threaded throat portion to interfit into a conventional spark plug socket in the engine, said bore extending throughout the length of said head portion and terminating in said mini-combustion chamber in said throat portion, said branch passage extending along an inclined path at an acute angle to the center axis of said bore and the assembly including an elongated tubular extension projecting from the end of said head portion opposite said throat portion along the path of said branch passage and housing said fuel metering means at a predetermined distance from said mini-combustion chamber to minimize heating of fuel in said metering chamber.

5. A spark plug and adapter assembly as defined in claim 1, wherein said metering piston has a passage therethrough and a pressure responsive check valve therein which closes the piston passage during the compression, power and exhaust phases and opens it during the intake phase.

6. A spark plug and adapter assembly as defined in claim 2, wherein said metering piston has a passage therethrough and a pressure responsive check valve therein which closes the piston passage during the compression, power and exhaust phases and opens it during the intake phase.

7. A spark plug and adapter assembly as defined in claim 4, wherein said metering piston has a passage therethrough and a pressure responsive check valve therein which closes the piston passage during the compression, power and exhaust phases and opens it during the intake phase.

8. A spark plug and adapter assembly as defined in claim 2, wherein said metering piston has a relieved portion along its exterior forming a space of predetermined volume with the adjacent wall portions of said first chamber portion to form said metering chamber.

9. A spark plug and adapter assembly as defined in claim 2, wherein said metering piston has a tapered relieved portion along its exterior at one end thereof forming a space of predetermined volume with the adjacent wall portions of said first chamber portion and said disc occupying its first position to form said metering chamber.

10. A spark plug and adapter assembly as defined in claim 1, wherein said metering piston has a relieved annular recess portion along its exterior encircling the piston forming a circumferential channel of predetermined volume with the adjacent wall portions of said first chamber portion to form said metering chamber.

11. A spark plug and adapter assembly as defined in claim 2, wherein said metering piston has a relieved annular recess portion along its exterior encircling the piston at one end thereof forming a circumferential channel of predetermined volume with the adjacent wall portions of said first chamber portion and said disc occupying its first position to form said metering chamber.

12. A spark plug and adapter assembly as defined in claim 6 wherein said metering piston has a tapered relieved portion along its exterior at one end thereof forming a space of predetermined volume with the adjacent wall portions of said first chamber portion and said disc occupying its first position to form said metering chamber.

13. A spark plug and adapter assembly as defined in claim 7, wherein said metering piston has a tapered relieved portion along its exterior at one end thereof forming a space of predetermined volume with the adjacent wall portions of said first chamber portion and said disc occupying its first position to form said metering chamber.

14. A spark plug and adapter assembly as defined in claim 4, wherein said metering piston has a relieved annular recess portion along its exterior encircling the piston forming a circumferential channel with the adjacent wall portions of said first chamber portion to form said metering chamber.

15. A spark plug and adapter assembly as defined in claim 4, wherein said metering piston has a relieved annular recess portion along its exterior encircling the piston at one end thereof forming a circumferential channel of predetermined volume with the adjacent wall portions of said first chamber portion and said disc occupying its first position to form said metering chamber.

16. A spark plug and adapter assembly as defined in claim 8, wherein said fuel metering means includes a bypass passage joining the branch passage portion between said metering piston and the mini-combustion chamber and having an inlet end opening positioned to register with said relieved portion in said metering piston when the latter occupies said retracted position to pass the metered quantity of fuel in said relieved portion to said branch passage portion during the intake phase.

17. A spark plug and adapter assembly as defined in claim 8, wherein said fuel metering means includes a bypass passage joining the branch passage portion between said metering piston and the mini-combustion chamber and having an inlet end opening positioned to register with said relieved portion in said metering piston when the latter occupies said retracted position to pass the metered quantity of fuel in said relieved portion to said branch passage portion during the intake phase, and a second branch passage communicating the fuel source conduit with said relieved portion in the metering piston when the latter comprises said projected position to supply fuel to the metering chamber defined by said relieved portion.

18. A spark plug and adapter assembly as defined in claim 10, wherein said fuel metering means includes a bypass passage joining the branch passage portion between said metering piston and the mini-combustion chamber and having an inlet end opening positioned to register with said channel in said metering piston when the latter occupies said retracted position to pass the metered quantity of fuel in said channel to said branch passage portion during the intake phase.

19. A spark plug and adapter assembly as defined in claim 11, wherein said fuel metering means includes a first bypass passage joining the branch passage portion between said metering piston and the mini-combustion chamber and having an inlet end opening positioned to register with said channel in said metering piston when the latter occupies said retracted position to pass the metered quantity of fuel in said channel to said branch passage portion during the intake phase, and a second branch passage communicating a quantity of fuel received from the fuel source conduit with said channel in the metering piston when the latter occupies said projected position to supply fuel to the metering chamber defined by said channel.

20. A spark plug and adapter assembly as defined in claim 14, wherein said fuel metering includes a bypass passage joining the branch passage portion between said metering piston and the mini-combustion chamber and having an inlet end opening positioned to register with said channel in said metering piston when the latter occupies said retracted position to pass the metered quantity of fuel in said channel to said branch passage portion during the intake phase.

21. A spark plug and adapter assembly as defined in claim 15, wherein said fuel metering means includes a first bypass passage joining the branch passage portion between said metering piston and the mini-combustion chamber and having an inlet end opening positioned to register with said channel in said metering piston when the latter occupies said retracted position to pass the metered quantity of fuel in said channel to said branch passage portion during the intake phase, and a second branch passage communicating a quantity of fuel recieved from the fuel source conduit with said channel in the metering piston when the latter occupies said projected position to supply fuel to the metering chamber defined by said channel.

22. A spark plug and adapter assembly as defined in claim 17, wherein said disc member is integrally formed with said metering piston.

23. A spark plug and adapter assembly as defined in claim 19, wherein said disc member is integrally formed with said metering piston.

* * * * *